Oct. 28, 1947.  A. G. KANDOIAN  2,429,630
LOCALIZER BEACON
Filed July 9, 1943
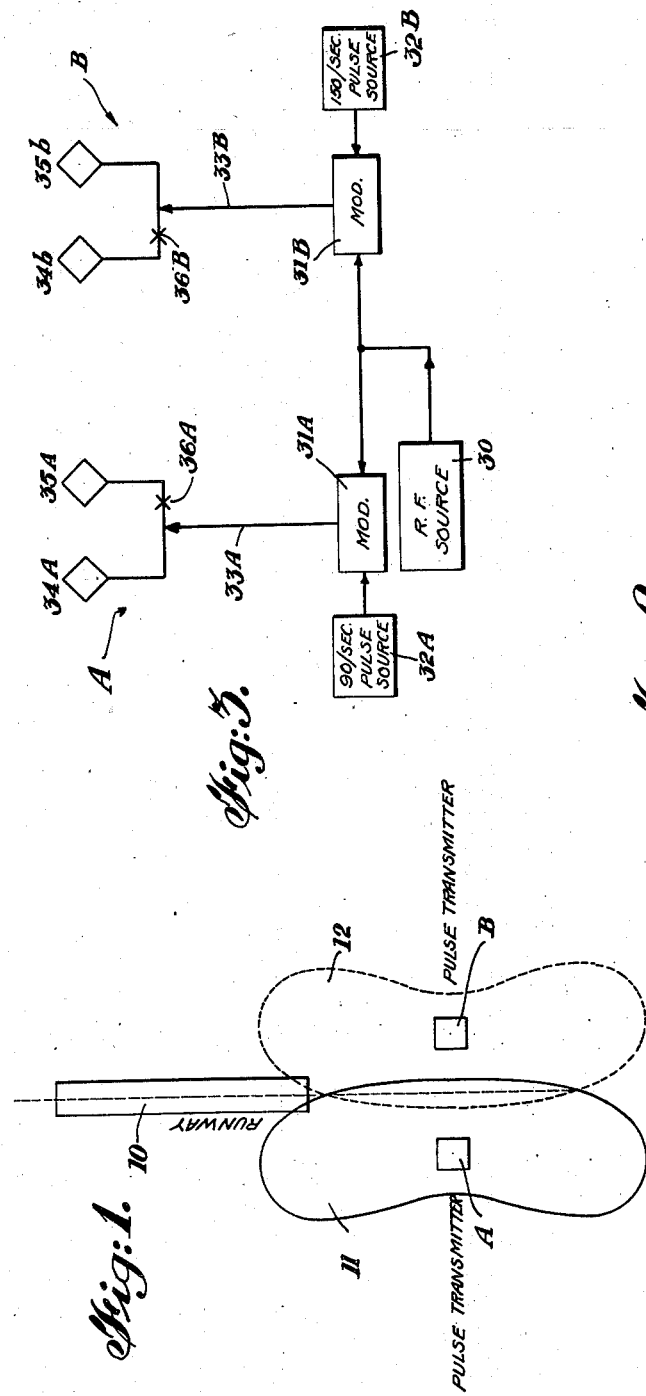
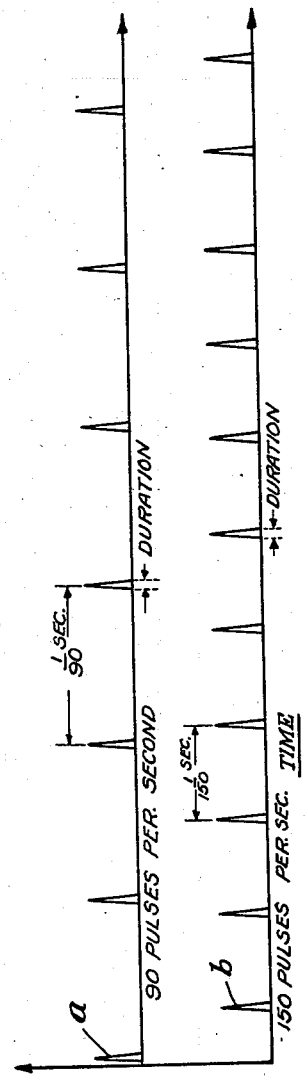
INVENTOR.
ARMIG G. KANDOIAN
BY
ATTORNEY Patented Oct. 28, 1947

2,429,630

UNITED STATES PATENT OFFICE 2,429,630

LOCALIZER BEACON

Armig G. Kandoian, New York, N. Y., assignor to Federal Telephone and Radio Corporation, Newark, N. J., a corporation of Delaware Application July 9, 1943, Serial No. 494,093

8 Claims. (Cl. 250—11)

This invention relates to radio beacons and more particularly to radio beacons for defining a course line or locating a runway for landing aircraft.

In the practical use of the localizer beacons for instrument landing, one of the problems encountered is the physical obstruction offered by the localizer antennas and housing which, in the existing systems, are located in line with the center line of the runway used. This obstruction is particularly serious when the wind shifts so that a landing must be made from a direction opposite to the normal instrument landing direction. In such cases, the landing must be made directly over the antenna and localizer house. To avoid this difficulty as much as possible, localizer houses are set far removed from the far end of the runway, generally several thousand feet. Furthermore, in many recent installations, the localizer house is sunk into the ground so that only the antennas protrude above the ground at a height of from four to five feet.

Such constructions, while they tend to avoid or minimize the obstruction caused by the localizer, have several resulting disadvantages. Because of the lowered height of the antennas, there is a considerable loss in field strength and about four times as much power is required to provide the equivalent distance range as from the same antenna arranged at twice the height. Since the localizer house is removed a considerable distance from the airport, it is also away from the clear space about the airport and is likely to be nearer trees, hangers and power lines causing difficulties due to reradiation. Furthermore, the construction and installation of an underground housing is much more expensive than installations provided above the ground since concrete walls and water-proofing equipment, etc. must be provided.

It is an object of my invention to provide a localizer arrangement which does not obstruct the clear pathway of an aircraft along the line of landing, and which overcomes the aforementioned disadvantages of many existing installations.

It is a further object of my invention to provide a beacon arrangement in which signals may be obtained by radiation of pulses timed at different radiation cadences and defining radiation patterns overlapping to define the beacon course.

It is a further object of my invention to so time pulses transmitted on either side of a course line that they will not overlap or interfere one with another.

According to a feature of my invention, I provide two radiating antennas or antenna arrays arranged on opposite sides of the landing runway so that they do not produce any obstruction along the runway itself. Each of these radiating units preferably provides a directive pattern, the two patterns overlapping along a zone the center of which defines the localizer course. From each of these radiators is transmitted a series of impulses of radio frequency energy. These impulses are preferably produced at different cadences corresponding to conventional frequencies now in use, for example, at 90 and 150 impulses per second, so that normal receiving equipment may be used on the craft. Also, the impulses are so related in time space with respect to one another that they occur during different intervals of time, consequently avoiding the necessity of controlling the phase relationship of the carrier energy applied to both radiators.

A better understanding of my invention and the objects and features thereof may be had from the particular description thereof made with reference to the accompanying drawing, in which:

Fig. 1 is a horizontal plan view illustrating the arrangement of the transmitters providing a localizer associated with a landing runway in accordance with my invention;

Fig. 2 is a set of curves illustrating the impulses transmitted from the transmitters shown in Fig. 1; and Fig. 3 is a simplified block diagram illustrating an antenna arrangement suitable for producing the radiation patterns in accordance with my invention.

In Fig. 1 is shown a landing runway 10 along which aircraft may normally land. Spaced on opposite sides of the vertical plane extending along the center of the runway are provided two impulse transmitters A and B which are designed to produce separate directive patterns 11 and 12. Transmitters A and B are spaced sufficiently far apart so that any craft following the course defined by the overlap of radiation patterns 11 and 12 will not come in contact with either of the transmitters. From transmitter A is sent a series of radio frequency impulses $a$, Fig. 2, spaced apart a predetermined period, for example, 1/90 of a second. From transmitter B is transmitted a second series of impulses $b$, Fig. 2, spaced apart a different distance than the first series, for example, a distance of 1/150 of a second. The impulses $a$, $b$ are preferably so timed that they are not simultaneously transmitted, so that there will be no carrier interference or interaction between the impulses along the course line defined by the beacon. Impulses a, b need not be extremely sharp but need be only sufficiently narrow so that they do not overlap in time. Since these impulses are transmitted individually for brief periods of time, they may be made of considerably greater amplitude than would be a regular continuously transmitted tone frequency. Likewise, since the impulses do not occur simultaneously, carrier frequency may be applied to transmitters A and B independent of the phasing since cancellation of the carrier frequency along the course line cannot occur.

Since the impulse cadence is chosen to be equal to that of the conventional modulation frequencies used, these impulses can be received on the regular equipment already supplied on the craft and do not require any additional equipment except at the ground station.

A typical circuit suitable for use in the system illustrated in Fig. 1 is shown in Fig. 3. Transmitters A and B are indicated generally and are spaced as in Fig. 1. Radio frequency energy may be supplied from a common radio frequency source 30 to separate modulators 31A, 31B. A 90 cycle per second impulse source is shown at 32A coupled to modulator 31A and 150 cycle per second impulse source is shown at 32B coupled to modulator 31B. The separate modulators 31A and 31B are coupled over separate lines 33A, 33B to antenna systems comprising units 34A, 35A interconnected by a line having a transposition 36A and units 34B, 35B interconnected over a line having a transposition 36B. Preferably, these antenna systems are adjusted to give a relatively sharp directive pattern as shown in Fig. 1.

It will be clear that if transmitters A and B were transmitting continuous tone signals of 90 and 150 cycles, for example, there would be a certain interaction between the units. If, for example, they were placed equidistant on opposite sides of the landing runway and energized with carrier waves 180° with phase opposition, there would be no carrier frequency along the course line and consequently the pilot would have to rely on zero signals as the proper course. This is generally unsatisfactory since the same indication would be obtained were he completely out of the range of the beacon. Furthermore, with varying degrees of phase relationship, the strength of the carrier along the course line would vary. In the present arrangement, however, the impulses are timed to occur at different intervals. Accordingly, there is generally no interference of the carrier along the course line at any time. For this reason, no care need be taken in adjusting the phasing relationship of carrier frequency furnished to the two transmitters.

It should be clear from the above description that the general principles of my invention need not be confined to structure of the particular type illustrated. Any kind of antenna radiators desired, may be provided. Likewise, separate carrier sources instead of a common source, as shown, may be used in the transmitters. Furthermore, any desired cadence period for the signals may be selected and many other changes obvious to those skilled in the art may be made without departing from the spirit of my invention as recited in the objects stated above and in the appended claims.

What is claimed is:

1. A radio beacon for guiding a craft along a predetermined course, comprising radiating means arranged in spaced relation on opposite sides of said course, said radiating means serving to produce overlapping field patterns of substantially equal intensities along said course line, means for imparting to one of said radiating means impulse signals of a predetermined spacing to provide one character of signal in the area of one of said field patterns, and other means for imparting to the other of said radiating means impulse signals of a spacing different from said spacing first recited to provide a different character of signal in the area of said other of said field patterns.

2. A radio beacon according to claim 1, wherein said impulse signals are spaced apart in time by one-ninetieth and one-hundred and fiftieth seconds, respectively.

3. A radio beacon system according to claim 1 wherein said pulses are made of relatively short duration with respect to the pulse spacing, said means for imparting signals to said field patterns being adjusted to avoid overlapping of the respective impulses of different timing.

4. A radio beacon for guiding a craft along a predetermined course line and arranged to be clear of the craft traveling along said line at any level, comprising a source of radio frequency energy, a first signal source for producing first signal impulses of a predetermined narrow width and a first predetermined repetition cadence, first modulating means for modulating said radio frequency energy with said first signal impulses, first radiating means spaced on one side of said course line for producing a radiation pattern overlying said course line, means for supplying modulated energy from said first modulating means to said first radiating means, a second signal source for producing second signal impulses of a predetermined narrow width and a second predetermined repetition cadence, second modulating means for modulating said radio frequency energy with said second signal impulses, second radiating means spaced from said course line on the opposite side from said first radiating means for producing a radiation pattern overlying said course line and partly overlying the area covered by the pattern of said first radiating means, and means for supplying energy from said second modulating means to said second radiating means, whereby a course is defined along said line by equality of said first and second signals.

5. A radio beacon according to claim 4 wherein said radiating means are each made directive to produce strong radiation along said course line and relatively weak radiation at right angles thereto.

6. A radio beacon according to claim 4 wherein said modulating means are so adjusted with respect to one another that said impulses do not overlap.

7. The method of guiding a craft along a predetermined course, comprising radiating from points spaced on opposite sides of the course impulses of radio frequency energy characterized by different impulse cadences, to produce along the desired course a zone of equal impulse intensity for both groups of impulses, and timing said impulses so that radiation occurs at different time periods from the opposite sides of said course, whereby adverse interaction along said course line is avoided.

8. The method of providing a guiding course for crafts, comprising radiating from a point on one side of said course a first series of radio frequency impulses having a first predetermined cadence in a pattern overlapping said desired course, radiating from a point on the opposite side of said course a second series of impulses on the same radio frequency in a pattern overlapping said desired course and said first named pattern, said second series of impulses having a second predetermined cadence, and so relating the impulses of said first and second series in time that they are radiated at different times, whereby carrier interference will not occur along said course regardless of phasing at said radiation points.

ARMIG G. KANDOIAN.

REFERENCES CITED

The following references are of record in the file of this patent:

FOREIGN PATENTS

| Number | Country | Date |
|---|---|---|
| 803,926 | France | Oct. 12, 1936 |